United States Patent [19]

Chevallier et al.

[11] 4,087,325

[45] May 2, 1978

[54] NUCLEAR REACTOR

[75] Inventors: René Chevallier, Grenoble; Michel Sauvage, Aix-en-Provence, both of France

[73] Assignees: Societe Generale de Constructions Electriques et Mecaniques Alsthom S.A.; Commissariat a l'Energie Atomique, both of Paris Cedex, France

[21] Appl. No.: 755,318

[22] Filed: Dec. 29, 1976

[30] Foreign Application Priority Data

Dec. 29, 1975 France .............................. 75 39982
Nov. 25, 1976 France .............................. 76 35513

[51] Int. Cl.$^2$ ............................................. G21C 15/00
[52] U.S. Cl. ......................................... 176/65; 176/38
[58] Field of Search ............... 176/40, 65, 87, 61–63, 176/60, 38

[56] References Cited

U.S. PATENT DOCUMENTS

| 3,425,907 | 2/1969 | Bonsel et al. ........................ 176/60 |
| 3,470,066 | 9/1969 | Livsey et al. ........................ 176/65 |
| 3,525,669 | 8/1970 | Germer ................................ 176/63 |
| 3,784,443 | 1/1974 | Vercasson ........................... 176/62 |
| 3,893,886 | 7/1975 | Aubert et al. ........................ 176/61 |
| 3,932,214 | 1/1976 | Aubert et al. ........................ 176/65 |
| 3,962,032 | 6/1976 | Berniolles et al. .................. 176/65 |

FOREIGN PATENT DOCUMENTS

| 2,096,939 | 3/1972 | France ................................ 176/65 |
| 1,525,183 | 5/1968 | France ................................ 176/63 |
| 2,133,410 | 1/1972 | Germany ............................ 176/65 |
| 2,217,863 | 12/1972 | Germany ............................ 176/65 |

Primary Examiner—Harvey E. Behrend
Attorney, Agent, or Firm—Sughrue, Rothwell, Mion, Zinn and Macpeak

[57] ABSTRACT

Integrated nuclear reactor cooled by a liquid metal and constituted by a main tank, which contains a central inner tank containing the core and the hot liquid metal, this inner tank being connected to individual cylindrical chambers each containing a heat exchanger wherein the surfaces of the inner tank and of the cylindrical chambers bulge radially outwards at the level of supply orifices for transferring the hot liquid metal from the inner tank to the heat exchangers and wherein the cylindrical chambers are fixed directly onto the inner tank by neck portions interconnecting the two bulges and providing a path for liquid metal flow.

10 Claims, 5 Drawing Figures

NUCLEAR REACTOR

BACKGROUND OF THE INVENTION

A liquid metal e.g. sodium is used as a coolant in integrated breader reactors. This sodium contained in the main tank is divided into two volumes namely a "cold collector" and a "hot collector" separated by a metal wall or "inner tank". In conventionally designed equipment, this inner tank is constituted by an upper cylinder with a diameter close to that of the main cooling tank, a lower cylinder with a diameter close to that of the reactor core and a truncated cone or "step" which interconnects the two cylinders. The pumps and the heat exchangers cross this step through sealed passages. The sodium passes from the hot collector to the cold collector through the heat exchangers in which it gives up heat to the secondary sodium.

On account of the size of present reactors, there are a number of disadvantages in this arrangement: great production difficulties, uncertain resistance to vibrations, very high thermal stresses.

A simpler arrangement consists in imparting to the outer tank a completely cylindrical shape with a diameter close to that of the reactor core and in feeding the heat exchangers through individual cylindrical chambers coaxial with these heat exchangers. These chambers are connected to the inner tank by horizontal tubing providing simultaneously the mechanical and hydraulic connections.

This configuration provides several advantages: limitation of the volume and of the free surface of the hot sodium, great reduction in the thermal radiation towards the conduit coupling, thermal problems easier to solve in the case of individual chambers than in the case of the step, reduction of the thermal stresses in the main tank, improved optimization of the tank and conduit coupling.

However, a major difficulty in such a solution resides in the connections between the individual chambers and the inner tank; indeed, in the case where the chambers are carried by the inner tank, these connections are the seat of high stresses due to mechanical forces (weight of the chambers and hydrostatic pressure).

In the case where the chambers are suspended separately (from the conduit coupling, for example), these connections will then be the seat of great differential expansions requiring the use of mobile connection parts (e.g. mechanical friction parts).

Preferred embodiments of the present invention reduce the stresses in the case where the chambers are fixed directly onto the inner tank.

SUMMARY OF THE INVENTION

The present invention provides an integrated nuclear reactor cooled by a liquid metal and constituted by a main tank comprising a central inner tank contains the core and the hot liquid metal, this inner tank being connected to individual cylindrical chambers each containing a heat exchanger wherein the surfaces of the inner tank and of the cylindrical chambers, bulge outwards at the level of supply orifices for transferring the hot liquid metal from the inner tank to the heat exchangers and wherein the cylindrical chambers are fixed directly on the inner tank by neck portions interconnecting the two bulges and providing a path for liquid metal flow.

The thermal protection of the chamber can be provided by a double wall fixed to the top part of the wall of the chamber in the zone outside the sodium, where the temperatures are practically homogeneous in both structures. This disposition makes it possible to avoid large thermal stresses.

At the bottom part of the chamber, sealing between the hot sodium and the cold sodium is provided without contact between the structures, using a hydropneumatic seal. The inner tank is also provided for its thermal protection with a double wall which is fixed by its lower part on the transversal bar frame of the main tank.

Numerous solutions are possible to provide for the continuity of the double wall of the chamber and of the inner tank for the movements and the differences in pressure are small. The solution comprising two bellows can, for example, be adopted.

According to a first embodiment, the thermal protection of the inner tank and of the cylindrical chambers can be provided by a virtually static layer of sodium in the annular space between the double walls, surmounted by a static layer of neutral gas.

According to a second embodiment, the thermal protection can be provided by forming a circulation of cold sodium in this annular space, the sodium being discharged through the top of the inner tank and through the top of the chambers.

According to a third embodiment, the thermal protection can be improved by providing a third casing round the inner tank and in the connection going towards the chambers, whose annular space contains sodium in communication with the sodium in the inner tank.

Two embodiments of the invention are described below by way of non-limiting examples with reference to the accompanying drawings.

DESCRIPTION OF THE PREFERRED EMBODIMENTS

Figure 1:
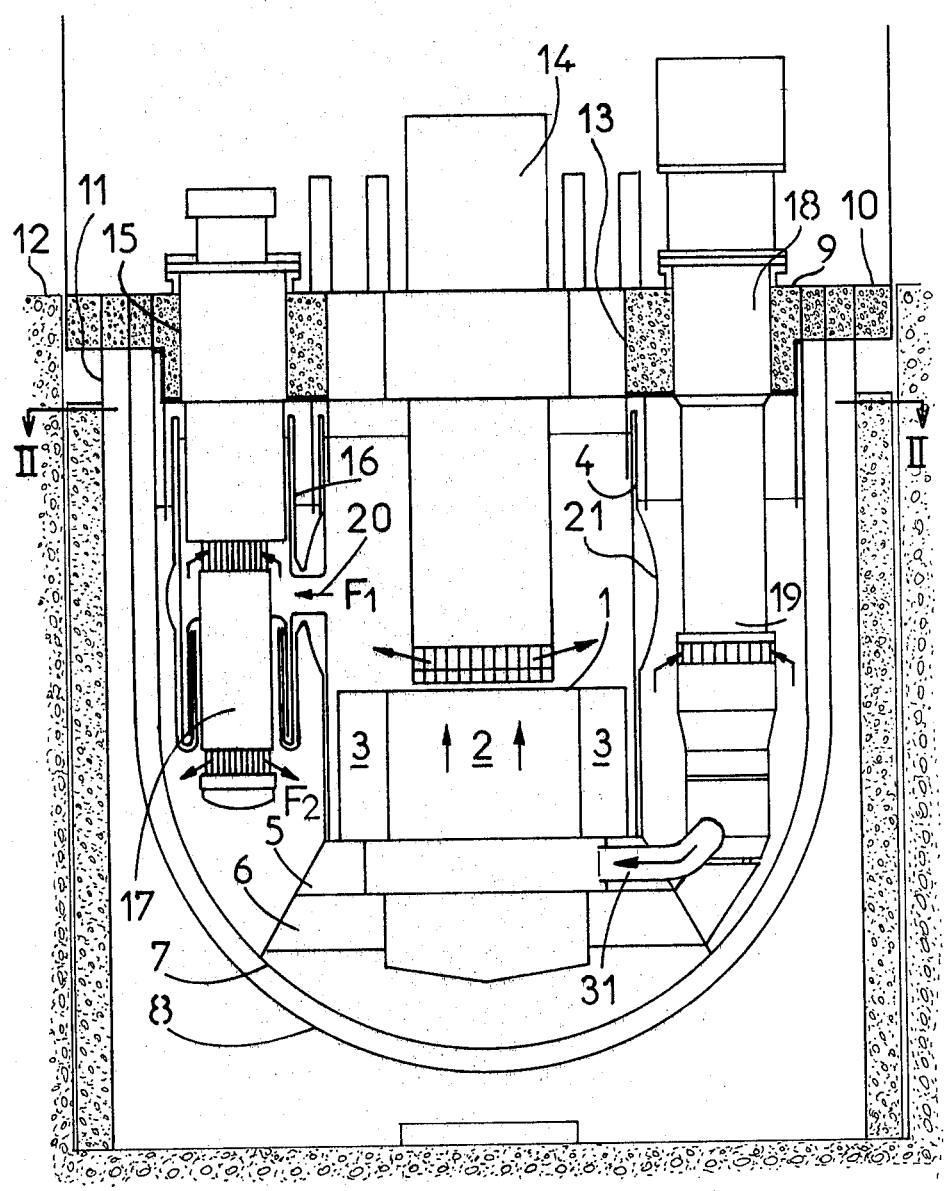
FIG. 1 is a schematic axial cross-section of a integrated fast neutron reactor constituting an embodiment of the present invention fitted with an inner tank of small dimensions and a chamber containing the heat exchangers.

In FIG. 1, reference 1 designates the core of a fast neutron nuclear reactor comprising in particular a central fuel-containing portion 2 and a surrounding fertile covering 3. The core 1 contained in a central inner tank 4 rests on a supporting diagrid 5 itself bearing on a floor plate 6 supported by the inner wall of a metal tank 7 which is the main tank. The tank 7 is externally lined with a second safety tank 8, the tanks 7 and 8 being suspended by their upper portions beneath a closing slab 9, resting by bearing elements 10 on a cylindrical casing 11 provided in a shield 12 having thick concrete walls, externally delimiting the reactor chamber.

The closing slab 9 comprises in a known way supply orifices such as 13, in particular for assembly of a system of rotating plugs 14 making access possible to the core inside the inner tank 4 through the volume of sodium (not shown) which it contains.

Figure 2:
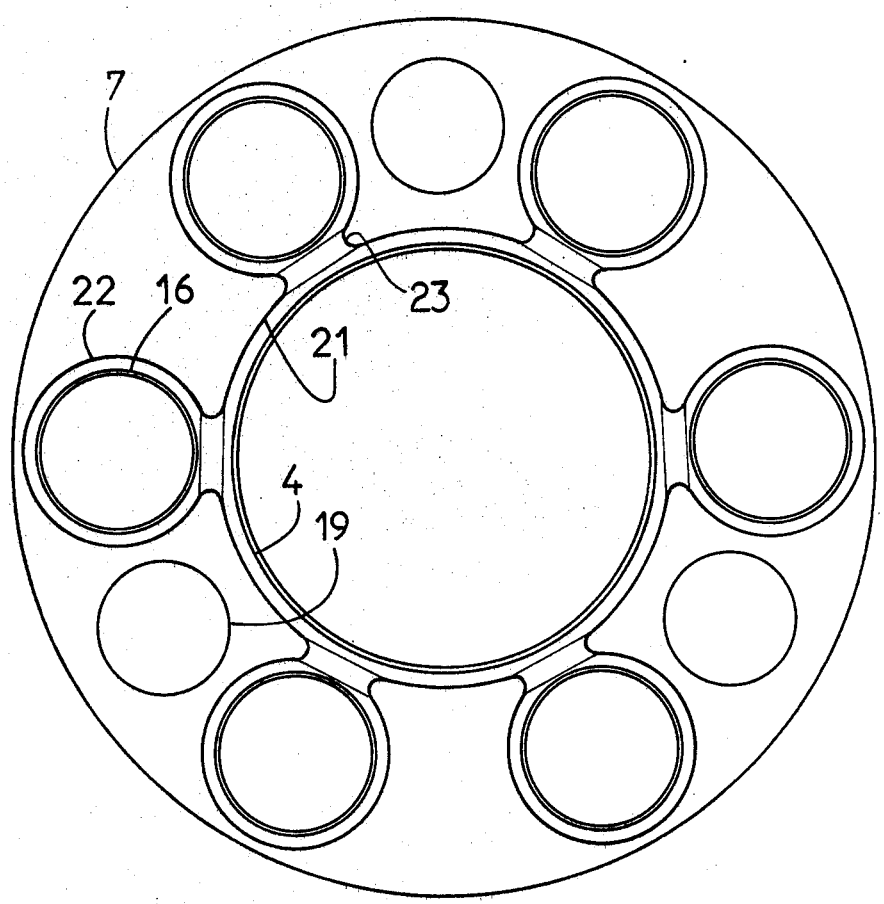
FIG. 2 is a horizontal cross-section along line II—II in FIG. 1.
Figure 3:
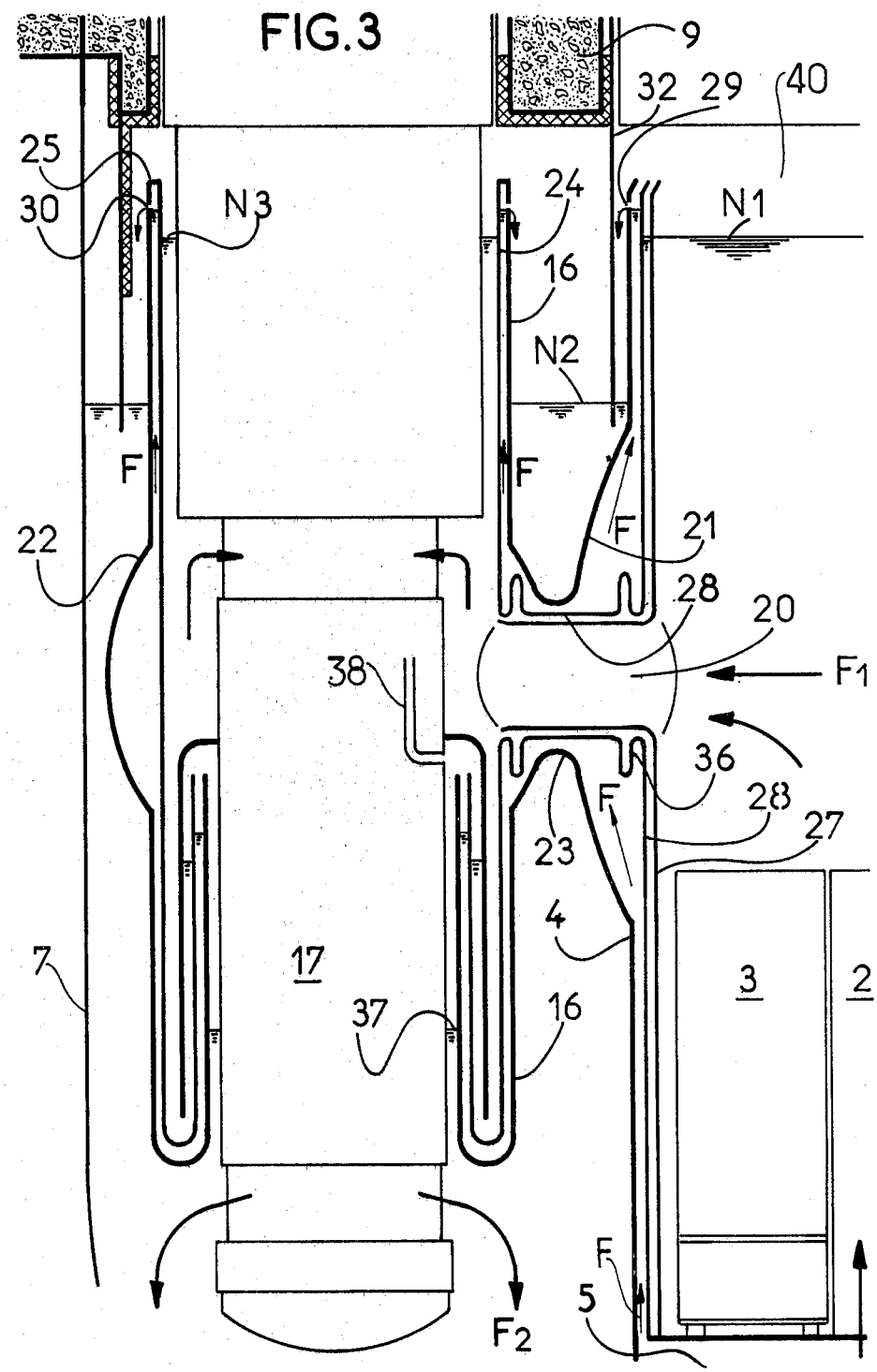
FIG. 3 is an axial cross-section on an enlarged scale of the connection of a chamber containing a heat exchanger.

Other orifices 15 spaced out all around the vertical axis of the core are provided in the closing slab 9 for mounting heat exchangers 17 and cylindrical skirts 18 containing sodium circulation pumps 19. Referring to FIGS. 2 and 3, it will be seen that the inner tank 4 comprises a set of cylindrical lobes 22 surrounding the heat exchangers 17 and connected to the main portion of the tank 4 via radially oriented neck portions 23. There are various coaxial layers of lining for sodium flow around the main portion and around the lobes of the tank 4 as described below; the main sodium supply orifice 20 being through the middle of the neck portions 23.

The cylinders of the lobe portions and of the main portion of the tank 4 have partially toroidal portions 22 and 21 about half way up their height. These toroidal portions or "bulging waistlines" include the opposite ends of the neck portions 23 forming a substantially direct connection of the lobes to the inner tank without the need for any intermediate pipe as such. This enables a good distribution of the stresses due to the weight of the lobes.

The level of the sodium in the inner tank 4 is shown at N1, the level in the main tank 7 is shown at N2 and the level in the cylindrical chamber 16 between the lobe 22 and the heat exchanger 17 is shown at N3, FIG. 3 these levels being surmounted by a gaseous cover 40 constituted by a neutral gas such as argon or helium, for example.

It will be seen that the hot sodium in the inner tank 4 leaves through each orifice 20 in the direction of an arrow F1, FIG. 3 to enter the chambers 16 and flow through the heat exchangers 17 and leave when cooled in the direction of arrows F2 into the main cooling tank, the suction for this sodium flow being provided by the pumps 19 which discharge into a return circuit towards the inner tank 4 through pipes 31. FIG. 3 shows a screen 32 delimiting the thermal radiation and the migration of sodium aerosols.

Figure 5:
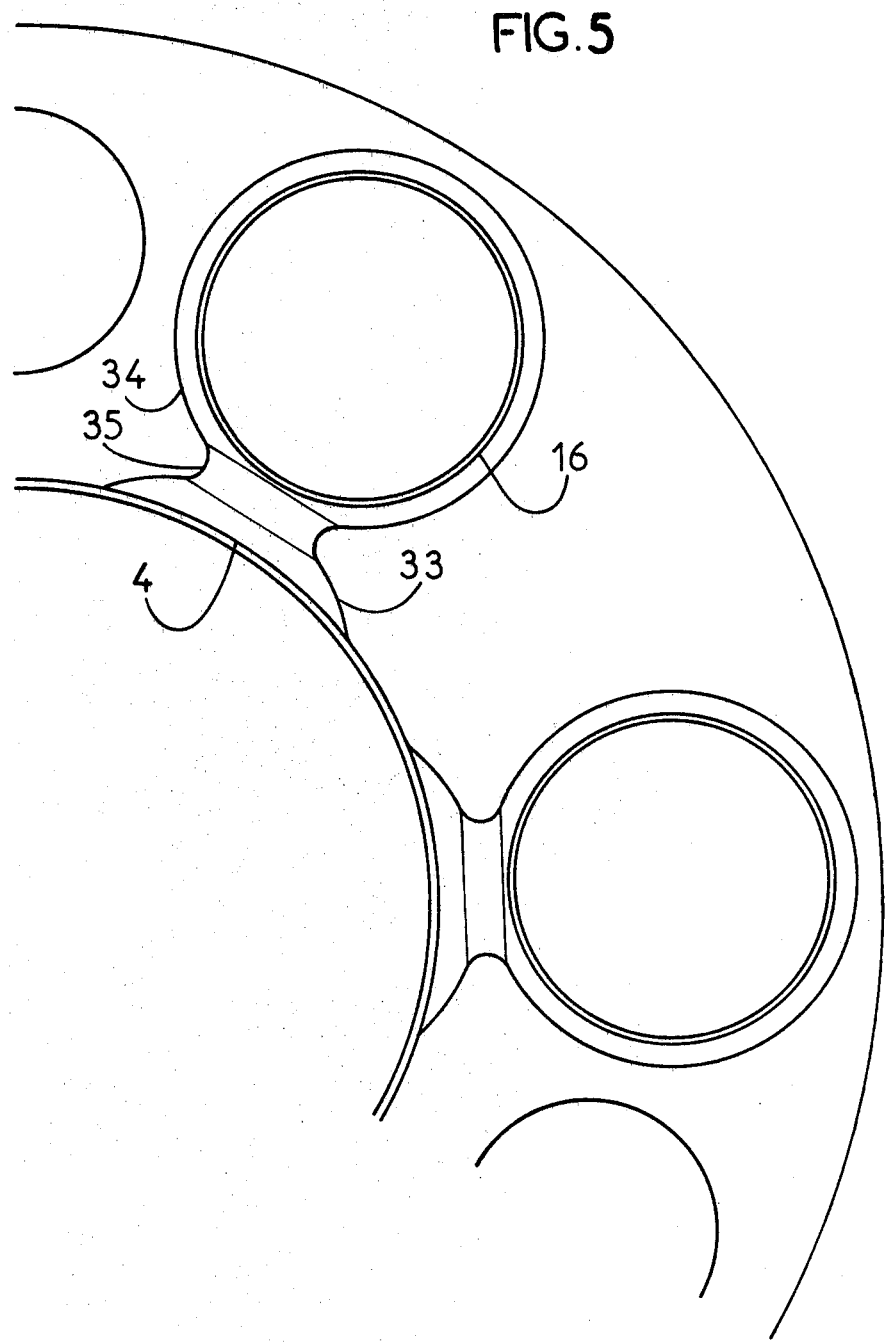
FIG. 5 is a horizontal cross-section of a variant of embodiment of the connection between the inner tank and the chambers.

In another embodiment according to the disposition in FIG. 5, a dome shape 33 is imparted locally to the surface of the inner tank 4 perpendicularly to the sodium feed orifice 20 and a toroidal shape 34 is imparted to the surface of the cylindrical chambers 16 around their whole periphery perpendicularly to their sodium feed orifice 20, the connection between these surfaces being ensured by a toroidal neck portion 35.

FIG. 3 shows the thermal protection of the chamber 16 provided by an inner wall 24 fixed at 25 to the top part of the outer wall of the chamber 16 in the zone outside the sodium, where the temperatures are practically homogeneous in these two walls. The inner wall 24 can thus be fixed without generating great thermal stresses.

The inner tank 4 is fitted with two concentric inner walls 27 and 28 ensuring its thermal insulation, both being fixed to the diagrid 5, the middle wall 28 being connected to the inner wall 24 of the chamber 16 and the innermost wall 27 extending into the connection between the tank 4 and the chamber 16.

The thermal protection of the assembly formed by the inner tank 4 and the chambers 16 is improved by ensuring a flow of cold sodium in the direction of the arrows F, FIG. 3, between the outer and middle walls of the inner tank 4 and jointly between both the walls of the chambers 16, sodium being discharged through the top 29 of the inner tank 4 and through the top 30 of the chambers. The space between the walls 27 and 28 is in communication with the hot sodium.

Sealing between the hot sodium and the cold sodium in the lower part of the chamber 16 is provided without mechanical contact between the various walls by a hydropneumatic type seal in the space above the sodium level 37 by the injection of a neutral gas into this space through a pipe 38.

Figure 4:
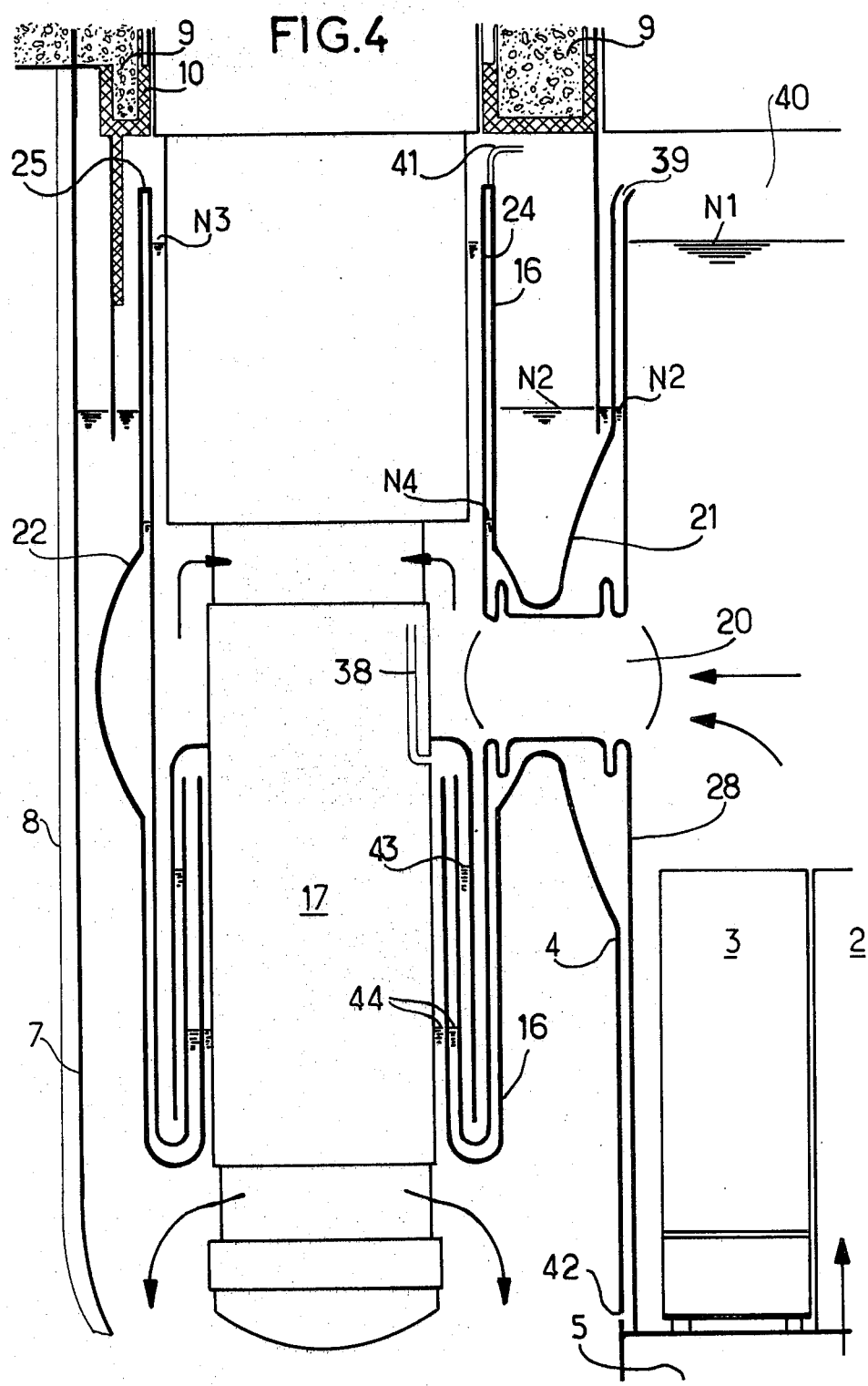
FIG. 4 is an axial cross-section of a variant of embodiment of the thermal protection of the inner tank and of the chambers.

FIG. 4 shows a variant of embodiment in which the thermal protection of the chamber 16 is provided by the inner wall 24 sealed at 25 to the top part of the outer wall of the chamber 16 in the zone outside the sodium where the temperatures are practically homogeneous in these two walls.

The inner tank 4 is provided with the inner wall 28 ensuring its thermal insulation, fixed to the diagrid 5, this inner wall 28 being connected to the inner wall 24 of the chamber 16. The annular space inside this wall communicates with the covering gas 40.

A pipe 41 for supplying a neutral gas such as argon or helium is connected to the top end 25 of the walls 16 and 24.

The outer wall of the tank 4 is fitted, just above its horizontal plane of connection with the diagrid, with orifices 42 making the annular space, comprises between the walls 4 and 28, communicate with the sodium of the cold collector, this making it possible to fill this annular space up to the level N2 corresponding to that of the cold collector in the main tank 7 and to fill the annular space between the walls 16 and 24 of the cylindrical chambers 16 up to the level N4 which is determined by the injection pressure of the neutral gas brought in by the pipe 41.

The neutral gas is injected at an appropriate pressure above the level N4 in order to bring this level slightly above the hot sodium supply orifice 20.

The sodium contained in the annular spaces is subjected exclusively to currents due to thermosiphon effects.

The inner tank 4 is thus thermally insulated by a virtually static layer of sodium whose height corresponds to that of the level of the sodium N2 in the main tank and it is insulated above this level by a layer of gas in communication with the covering gas 40. The chamber 16 is thermally insulated in its bottom part by a virtually static layer of sodium extending up to the height of the level N4 and in its top part by a static layer of neutral gas brought in through the pipe 41 at a determined pressure.

Sealing between the hot sodium 43 and the cold sodium 44 in the lower part of the enclosure is provided without mechanical contact between the walls by a hydropneumatic seal in the space above the levels 43 and 44 by the injection of a neutral gas into this space through the pipe 38.

What we claim is:

1. In combination: an integrated nuclear reactor cooled by a liquid metal, said reactor comprising: a main tank holding liquid metal, a central inner tank within said main tank, and containing the reactor core, and individual cylindrical chambers within said main tank and circumferentially positioned about said inner tank, each chamber housing a liquid metal heat exchanger, the surfaces of the inner tank and of said cylindrical chambers bulging outwardly and neck portions directly interconnecting the inner tank to the cylindrical chambers at said bulges and forming supply orifices for the flow of liquid metal heated by said nuclear reactor core to said heat exchangers for cooling thereof with said neck portions causing said inner tank to directly support said cylindrical chambers and unitary thermal protection means for said inner tank and said individual cylindrical chambers and extending the length of those portions of said inner tank and said cylindrical chambers immersed within the liquid metal and about said inner tank and said cylindrical chambers at the level of said neck portions for maintaining the neck portions and the adjacent portions of said chambers and said inner tank at generally the same temperature to prevent thermal stress at the connections between the inner tank and the cylindrical chambers as defined by said neck portions.

2. A nuclear reactor according to claim 1, wherein the bulges of the inner tank and of the cylindrical chambers extend all around their peripheries.

3. A nuclear reactor according to claim 1, wherein the inner tank has localised bulges adjacent each heat exchanger container, while the bulges of the said chambers extend all around their peripheries.

4. A nuclear reactor according to claim 1, wherein said thermal protection means comprises spaced inner and outer walls for both said inner tank and said cylindrical chambers with said inner and outer walls defining a series flow passage for cooled liquid metal discharging from the heat exchanger, said flow passage at said inner tank being open at the bottom to receive cooled liquid metal discharging into said main tank from said heat exchangers and said reactor further comprising pump means for pumping liquid metal through said heat exchangers for cooling said liquid metal and for causing said liquid metal to flow towards the bottom of said main tank and to said inner tank flow passage opening.

5. A nuclear reactor according to claim 4, wherein the inner wall of the cylindrical chambers is fixed to the upper part of the outer wall of the chamber in a zone outside of the liquid metal with the annular space formed between the inner and outer walls of the chamber communicating with a neutral gas surmounting the liquid metal of the main tank, the inner tank inner wall being connected to the inner walls of the chambers and defining with the inner tank an annular space communicating with said neutral gas covering the mass of cooled liquid metal provided between the inner tank and said chambers, and means for discharging said liquid metal into the main tank at the tops of said annular spaces.

6. A nuclear reactor according to claim 4, wherein said inner and outer walls of said cylindrical chambers are fixed in a sealed manner at their top in a zone outside of the liquid metal, and said reactor further comprises means for injecting a gas at that point in the annular space formed between the inner and outer walls of the chamber, and wherein said inner tank inner wall is connected to the inner walls of the cylindrical chambers, and wherein the annular space formed between the inner and outer walls of the inner tank communicate at its top part with a neutral gas surmounting the liquid metal contained in the main tank and at its bottom part with the liquid metal of said main tank.

7. A nuclear reactor according to claim 5, wherein the inner tank comprises an innermost third wall delimiting with the inner wall a tubular space whose bottom part communicates with the hot liquid metal of said inner tank and whose top part communicates with the said neutral gas covering that surmounts the liquid metal contained in the main tank.

8. A nuclear reactor according to claim 5, wherein a hydropneumatic type seal situated at the lower part of each cylindrical chamber provides sealing between the hot liquid metal and the cold liquid metal.

9. A nuclear reactor according to claim 6, wherein the inner tank comprises an innermost third wall delimiting with the inner wall a tubular space whose bottom part communicates with the hot liquid metal of said inner tank and whose top part communicates with said neutral gas covering that surmounts the liquid metal contained in the main tank.

10. A nuclear reactor according to claim 6, wherein a hydropneumatic type seal situated at the lower part of each cylindrical chamber provides sealing between the hot liquid metal and the cold liquid metal.

* * * * *